United States Patent [19]

Cheetham

[11] Patent Number: 4,587,381
[45] Date of Patent: May 6, 1986

[54] LINE IDENTIFICATION APPARATUS FOR A TELECOMMUNICATIONS EXCHANGE

[75] Inventor: Robert Cheetham, Coventry, England

[73] Assignee: The General Electric Company, P.L.C., England

[21] Appl. No.: 556,343

[22] Filed: Nov. 30, 1983

[30] Foreign Application Priority Data

Dec. 2, 1982 [GB] United Kingdom ............... 8234416

[51] Int. Cl.$^4$ .................... H04Q 1/30; H04Q 3/78
[52] U.S. Cl. ............................. 179/18 FH; 179/18 J
[58] Field of Search ............. 179/18 FH, 18 J, 18 ES, 179/18 FG

[56] References Cited

U.S. PATENT DOCUMENTS

| 3,746,797 | 7/1973 | Meise, Jr. et al. ............... 179/18 D |
| 3,925,623 | 12/1975 | Tysseland ....................... 179/18 FH |
| 4,295,007 | 10/1981 | Astegiano et al. ................ 179/7 R |

FOREIGN PATENT DOCUMENTS 0024402 2/1977 Japan ............................. 179/18 FH Primary Examiner—Thomas W. Brown
Attorney, Agent, or Firm—Kirschstein, Kirschstein, Ottinger & Israel

[57] ABSTRACT

A telecommunications exchange includes line identification apparatus in which signals on additional wires (the 'p' wires) (1) which are switched in parallel with the speech pairs are used to identify an originating exchange line circuit. On detection of seizure of the 'p' wire (1) at one of a number of call logging points (11) a data signal is transmitted by a transmitter circuit (9). On detection of such a signal a receive circuit (2) adds a plurality of data bits to the signal identifying one of a number of associated 'p' wires (1) on which the signal was received and transmits the modified data signal to a receiver multiplexer (4, 4'). On receipt of the modified data signal the receiver multiplexer (4, 4') adds a respective plurality of data bits to the signal identifying one of a plurality of receivers (2) connected thereto and retransmits the signal to a further multiplexer (5, 5'). The further multiplexer (5, 5') adds a respective plurality of bits and transmits the signal to a control circuit (6, 6') which adds further bits identifying the further multiplexer (5, 5'). The complete signal is then transmitted to call logging apparatus.

19 Claims, 13 Drawing Figures

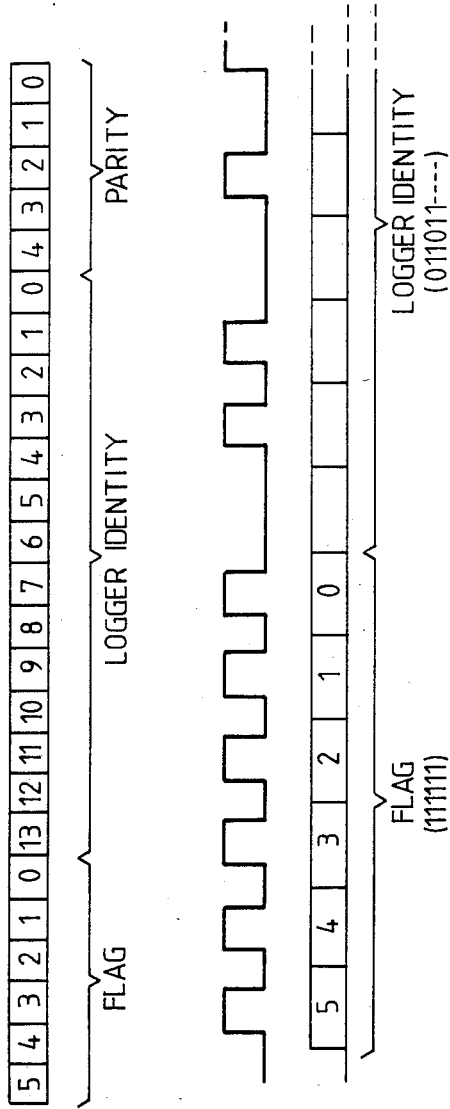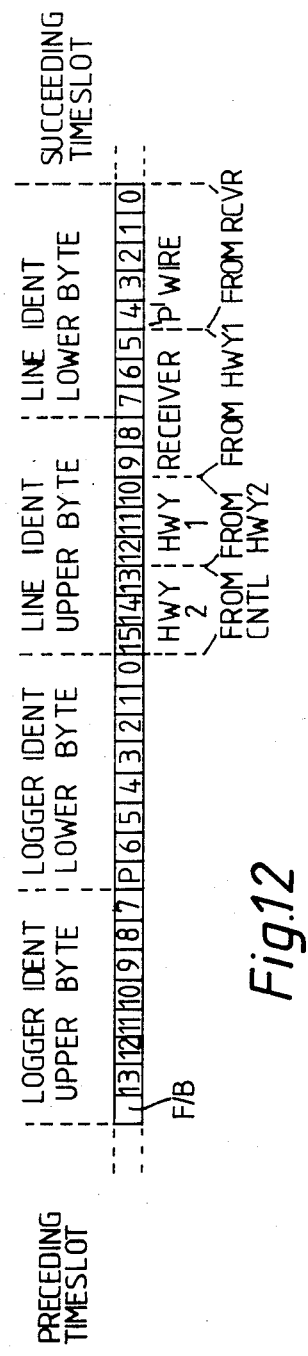

LINE IDENTIFICATION APPARATUS FOR A TELECOMMUNICATIONS EXCHANGE

The present invention relates to telecommunication exchanges and in particular to line identification apparatus used in such exchanges.

Call logging requires an identification of the originating line of each call to be passed to a call logger associated at some concentration point of a telephone exchange—for example at a register or at a line connection.

In conventional designs of line identification apparatus the identification data is generated completely on a per subscriber basis by using for example hard-wired transformer cores. Alternatively the identification data may be individually strapped on a strapping field in the subscriber line circuit. Such line identification apparatus is not easily added to an existing exchange.

It is an object of the present invention to provide improved line identification apparatus for use in telecommunications exchanges which is capable inter-alia of use to provide line identification without significantly affecting the mode of operation of a conventional exchange.

According to the present invention in a telecommunications exchange of the kind having switched speech pairs and additional wires ('P' wires) which are switched in parallel with the speech pairs, detection means is responsive to changes in the electrical state of connections through the exchange at each of a plurality of call logging points to cause a data signal to be supplied to the additional wires at each call logging point at which such a change is detected, the data signal comprising a plurality of data bits identifying the particular call logging point, a plurality of receivers are each arranged to scan the additional wires of a plurality of line circuits individual to that receiver to detect the presence of a data signal as aforesaid supplied thereto over an additional wire path through the exchange, each of said receivers being arranged to modify the data signal so detected by the addition of a plurality of data bits which identify the particular additional wire of those scanned by the receiver and to transmit the modified data to a receiver multiplexer which is common to said plurality of receivers and which further modifies the data signal by the addition of a plurality of data bits identifying the particular receiver supplying the modified data signal, the further modified data signal being utilised to identify the line circuit to which the particular call logging point is connected.

Preferably a plurality of receiver multiplexers are each arranged to receive modified data from a respective plurality of receivers and to transmit the further modified data signal to a further multiplexer which is common to said plurality of receiver multiplexers and which modifies said data by the addition of a further plurality of data bits identifying the particular receiver multiplexer supplying the further modified data signal.

There may be a plurality of said further multiplexers each operating as aforesaid and each connected to control means which is arranged to add to the data signal a respective plurality of data bits identifying the particular one of said further multiplexers supplying said data signal.

The control means may be arranged to transmit the data to call logging means, which may be a computer which also acts as said detection means. Said detection means may be arranged to detect seizure of the speech pair at each of said logging points and to forward data identifying the seized call logging point to control means.

On receipt of such data, said control means may be arranged to forward a corresponding data signal to a first demultiplexer which determines from a first plurality of the data bits therein which of a plurality of second demultiplexers is to receive the signal. Each of said second demultiplexers may be arranged to determine from a second different plurality of data bits which of a respective plurality of transmitters to which each of said second demultiplexers are connected is to receive said data signal. Each of said transmitters may be arranged to forward a corresponding data signal in dependence on a further plurality of data bits to the particular one of a respective plurality of additional wire call logging points to which it is connected.

Data transfer between receivers and said receiver multiplexers and between said receiver multiplexers and said further multiplexers and between said further multiplexers and said control means may be in channels of respective time-division-multiplex (TDM) signals. Similarly data transfer between said control means, first demultiplexer, second demultiplexer and transmitters may be in channels of respective TDM signals between them.

The data rate of the respective TDM signals towards the system center may be increased in comparison with the data rate of respective TDM channels towards the receivers or the transmitters. There may be less logging points than line circuits by a factor of at least two.

Line identification apparatus for use in a telecommunications exchange in accordance with the invention will now be described by way of example only with reference to the accompanying drawings of which:

Figure 1:
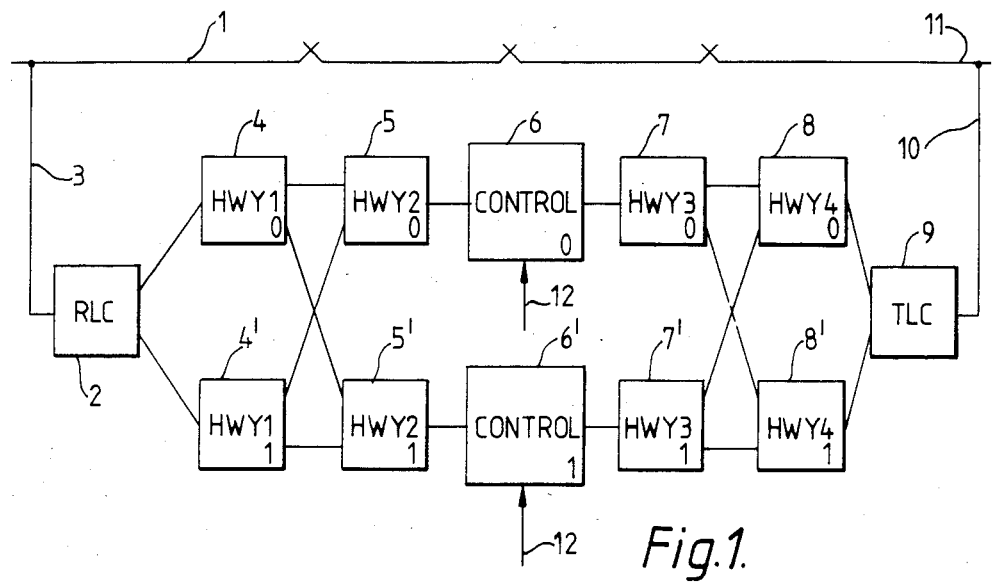
FIG. 1 is a schematic diagram of the apparatus.
Figure 5:
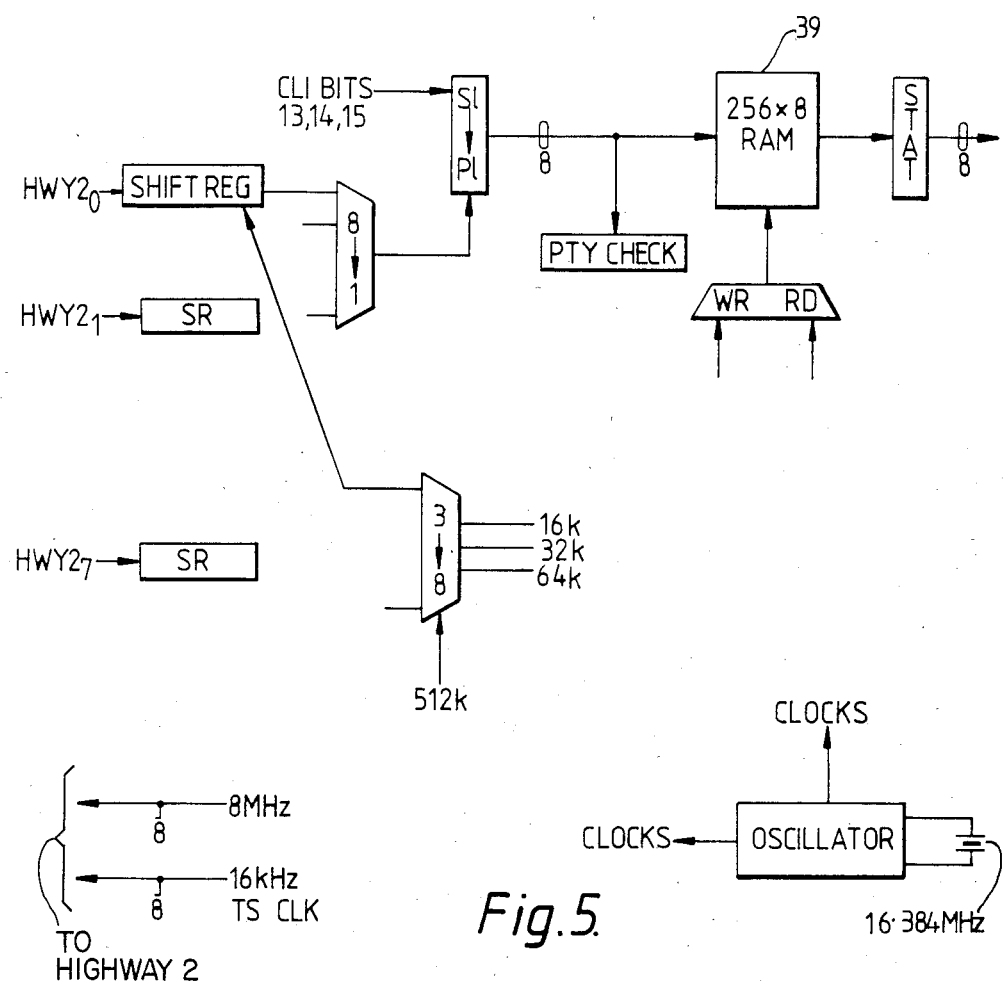
Figure 7:
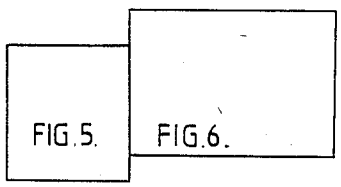
Figure 6:
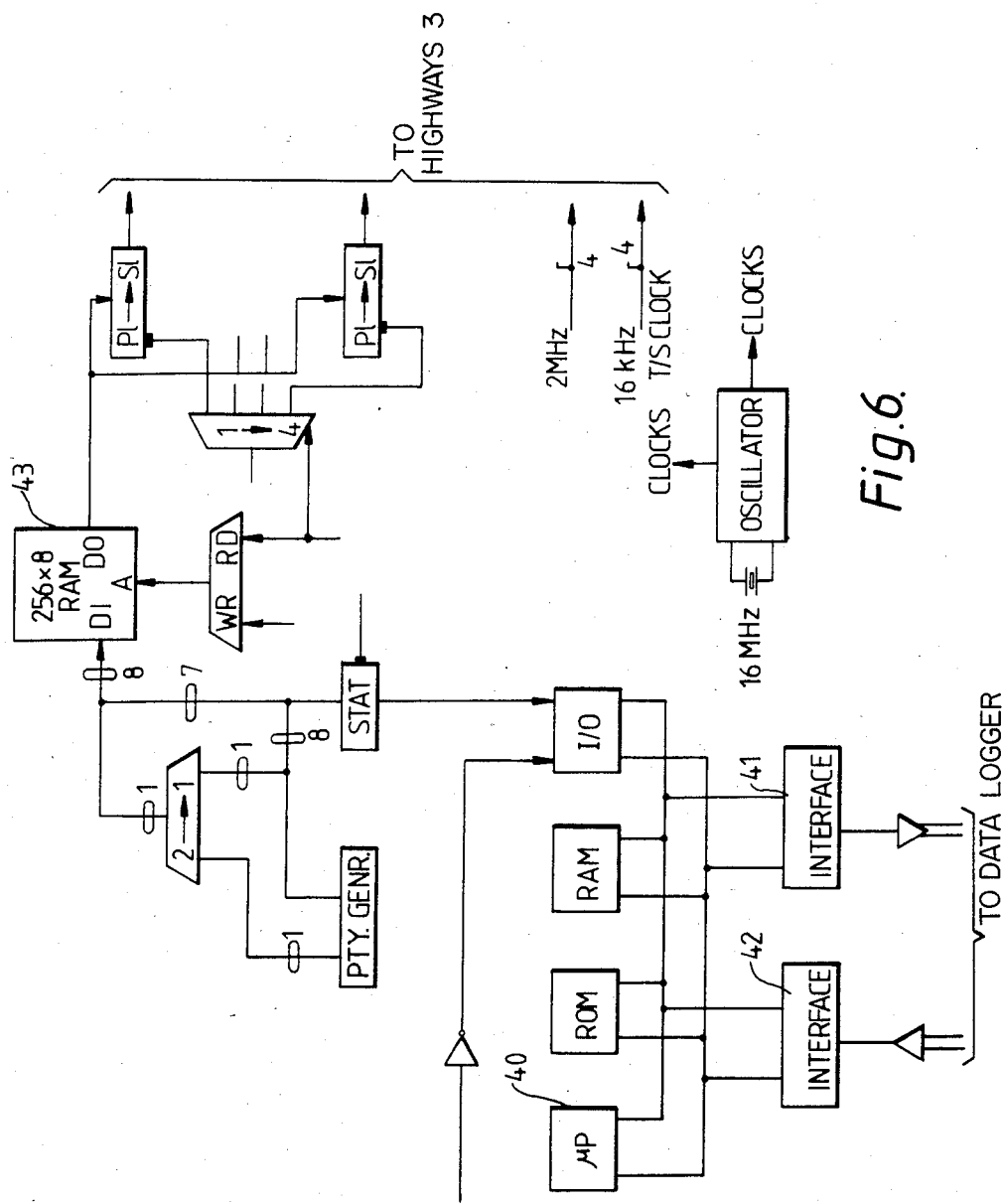
Figure 8:
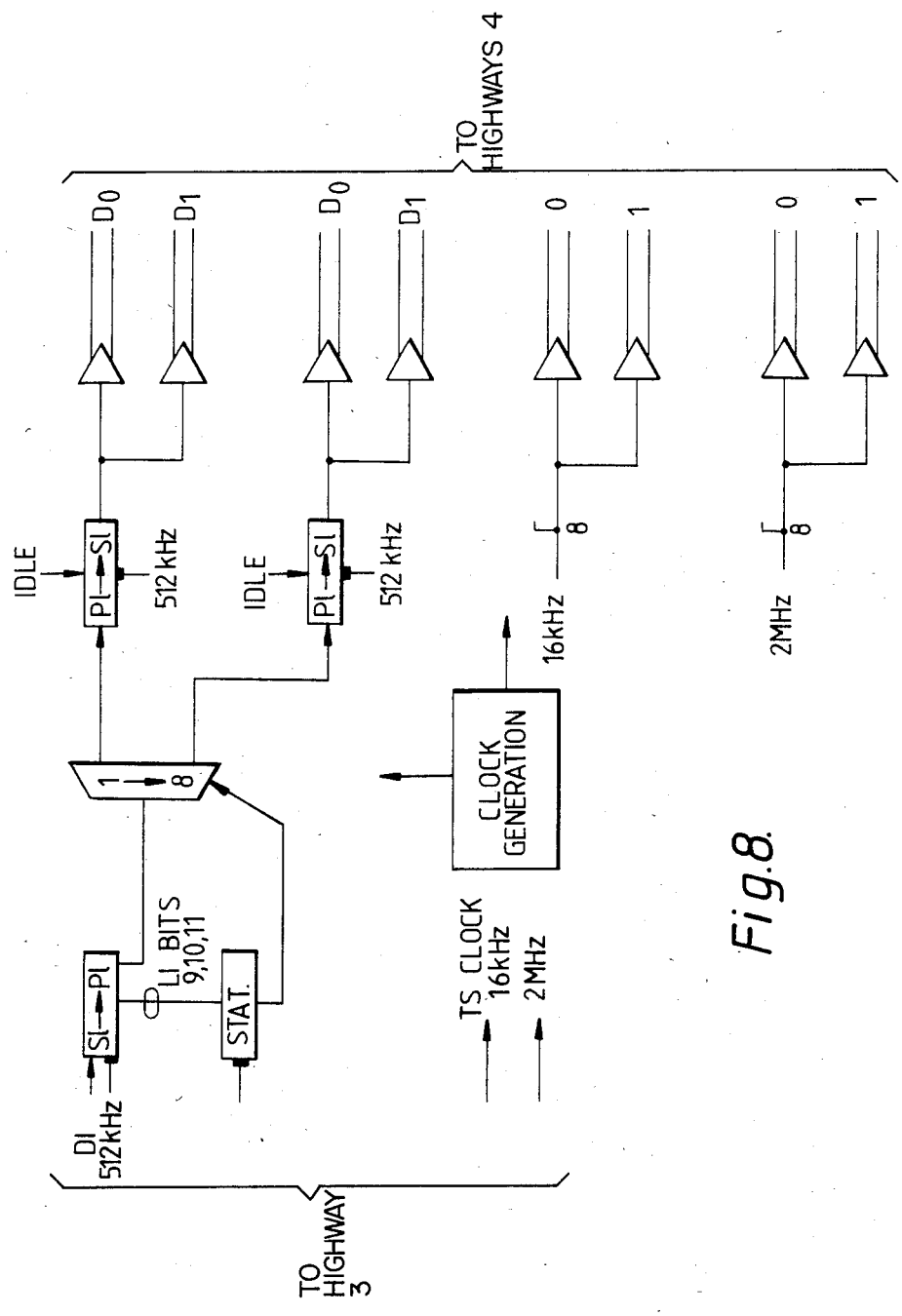
Figure 9:
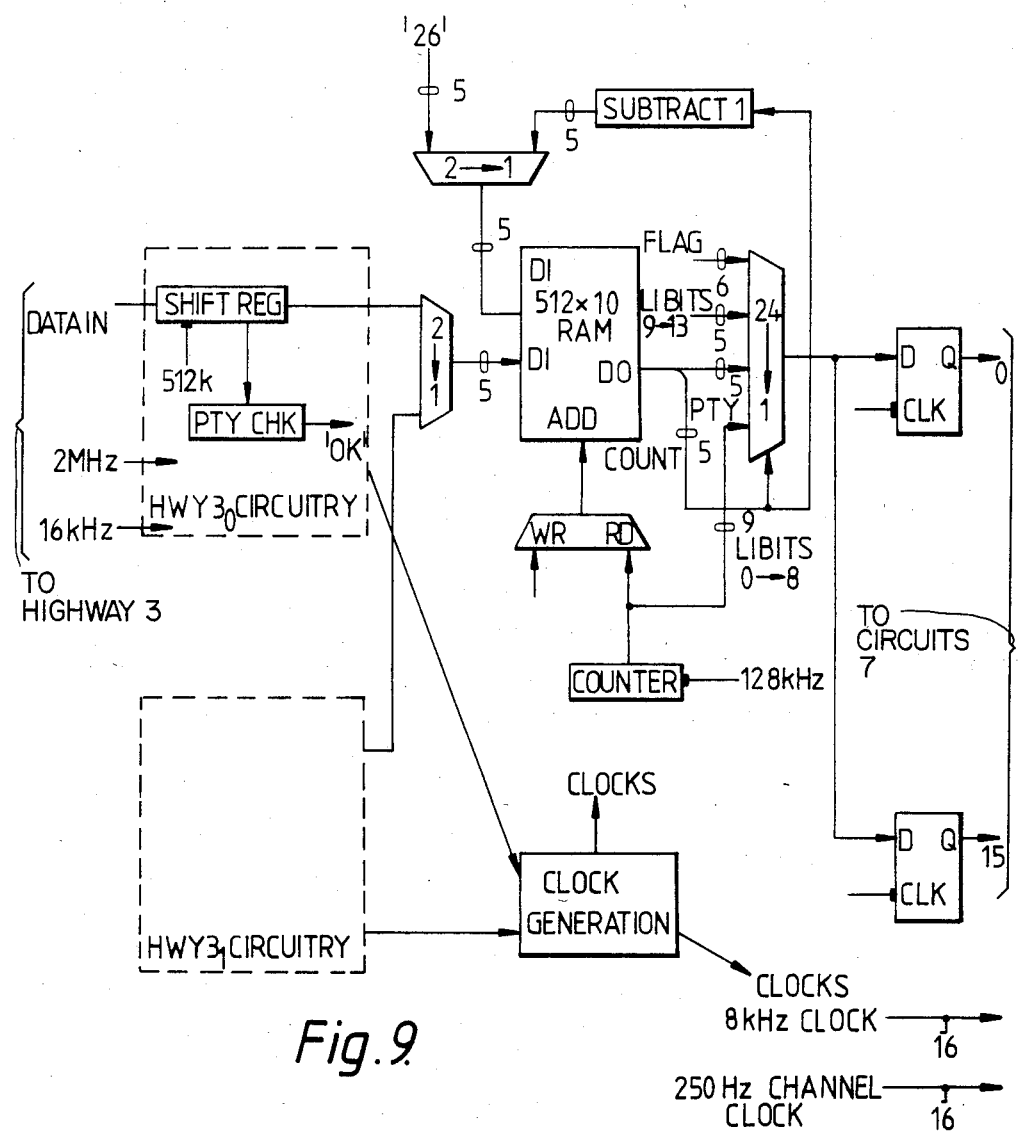
Figure 10:
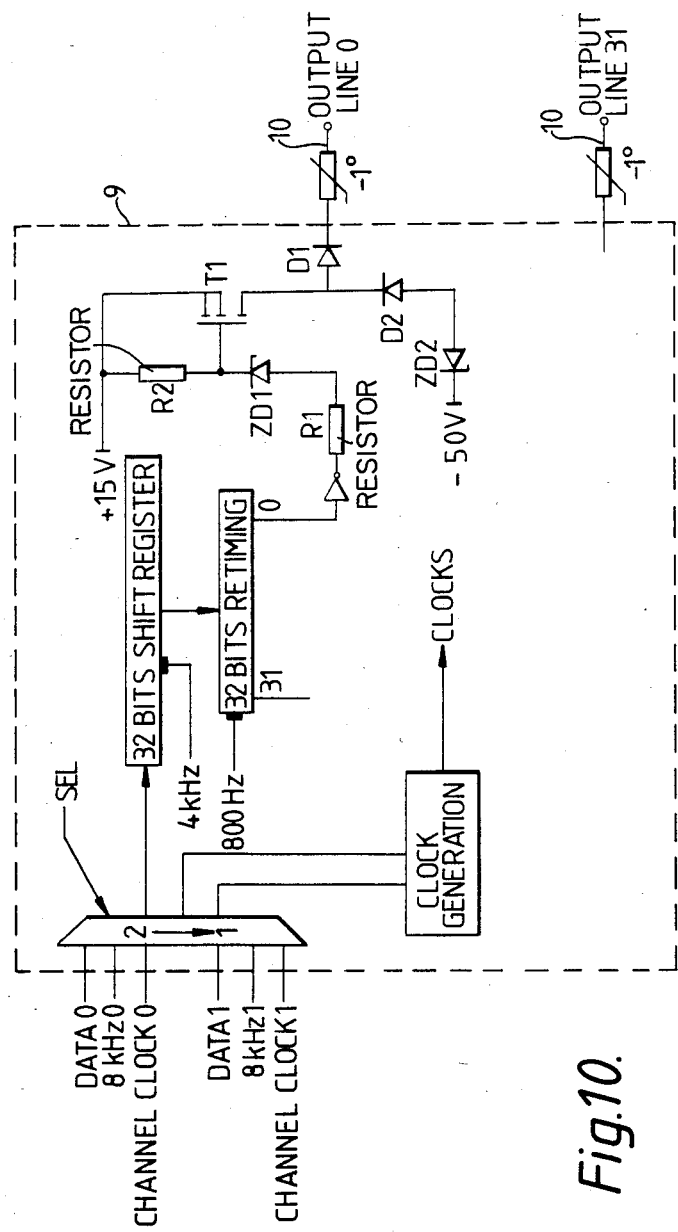

FIGS. 5 and 6 when assembled as shown in FIG. 7 show a schematic diagram of the control of FIG. 1;

FIG. 8 is a schematic diagram of one of the transmit highways of FIG. 1;

FIG. 9 is a schematic diagram of another of the transmit highways of FIG. 1;

FIG. 10 is a schematic diagram of a transmitter of FIG. 1; and

FIGS. 11 (a), 11 (b) and 12 are diagrams showing the data format of signals at various points in the diagram of FIG. 1.

Referring to FIG. 1 in which one of the switched 'P' wires 1 of an exchange is shown diagrammatically, the apparatus comprises a number of receivers 2 (only one of which is shown) each connected to the 'P' wires of up to thirty-two line circuits (not shown) by a respective connection 3.

Each receiver 2 is connected to two 'highway one' circuits 4 and 4' for security reasons, each of the highway one circuits 4 and 4' having four groups of connections each from eight receivers 2. Each highway one circuit 4 and 4' is connected to two 'highway two' circuits 5 and 5' and the two highway circuits 5 and 5' are connected to respective control circuits 6 and 6'. It is here noted that although for clarity only two highway one circuits 4,4' are shown, eight such circuits are connected to each highway two circuit 5,5'. Similarly eight highway two circuits 5,5' are connected to each control circuit 6,6'.

On the other side the control circuits 6,6' are each connected to four highway three circuits 7,7', each of which are connected to eight highway four circuits 8,8' each of which may be connected to up to eight transmitter circuits 9. Each of the transmitter circuits 9 may supply up to thirty-two selectable points 11 on different 'P' wires 1 of the exchange.

Briefly the apparatus functions in the following manner. On detection of a seize of the speech pair of the exchange (not shown) at a point corresponding to one of the points 11, a call logger (not shown) forwards a request to one of the controls 6 by way of a connection 12. The control 6 causes a signal to be sent to the transmitter 9 which is connected to the appropriate point 11, which transmitter will forward a signal on the 'P' wire 1. When the signal which inter-alia identifies the call logger is detected by the receiver 2, it adds 5 bits to the message (identifying in binary one of thirty-two line circuits connected thereto), and forwards the message in a manner hereinafter described to one of the highway one circuits, say, 4. When the message is received by the highway one circuit 4, it adds a further five bits before the message is forwarded to one of the highway two circuits, say, 5. The further five bits identify the receiver 2 from which the message was received.

The highway two circuit 5 adds a further three bits to the message (identifying one of eight highway one circuits 4) and the now complete message is returned to the control circuit 6. Having received a first message, the control circuit 6 causes the transmitter 9 to repeat its request on the 'P' wire 1, and the process is repeated.

When two identical messages have been received in this manner, the control circuit 6 forwards the data defining the originating line circuit (not shown) to the call logger.

Before considering the functioning of the circuit in detail, it is necessary to consider the format of the message sent by the transmitter 9 on the 'P' wire 1. Thus referring to FIG. 11 (a) the message comprises twenty-five data bits, each of four milliseconds duration the first six of which define a prefix. Fourteen further bits define the identify of the logger whilst a further five bits are provided to give a parity check on the whole message when it is received.

A typical 'P' wire message is shown in FIG. 11 (b) in which it will be seen that each bit consists of a one millisecond period at zero voltage followed by either a two millisecond period at fifteen volts (representing data bit value 'one') or a further two milliseconds at zero volts (data bit value 'zero') and a further one millisecond period at zero volts.

Thus it will be seen from FIGS. 11 (a) and (b) that the prefix consists of six 'one's' for which the receiver 2 will scan each of its associated line circuit 'P' wires 1.

Figure 2:
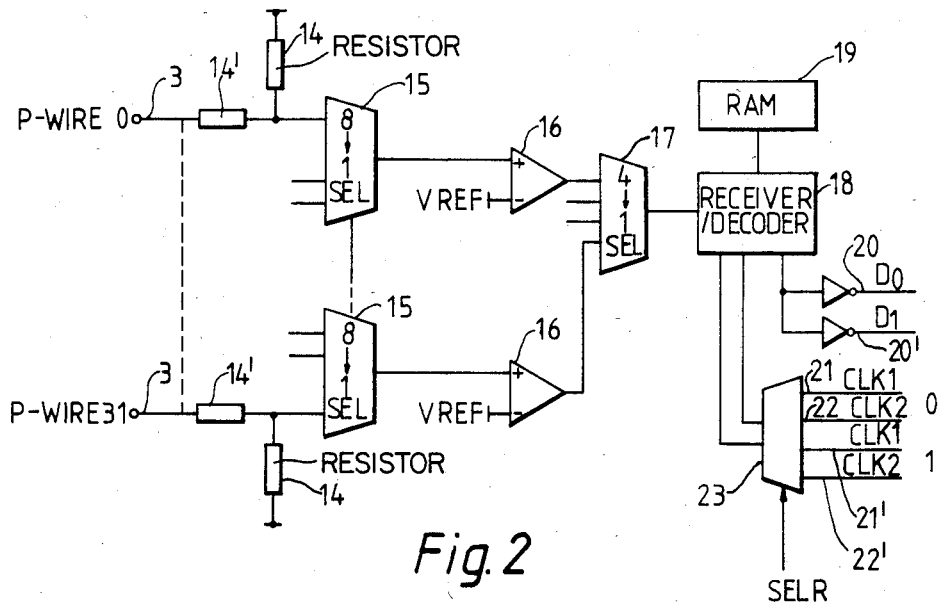
FIG. 2 is a circuit diagram of a receiver of the apparatus of FIG. 1.

Referring now to FIG. 2, the thirty-two 'P' wire connections 3 each have feed and balancing resistors 14, 14' and are serviced in four groups of eight. Each group is connected to a one out of eight selector 15, each of which feeds a respective comparator 16. The selectors 15 are driven at 32 kilohertz. Thus each two millisecond bit of an input message will be sampled eight times.

The comparators 16 are in turn sampled by a four-to-one selector 17 which is driven at 256 kilohertz such that a receiver/decoder 18 receives at eight times the bit rate. The receiver/decoder 18 is arranged to identify the twenty-five bits in each message and performs a parity check on each message using the five parity bits. When a correctly received message is identified by the receiver/decoder 18 it is stored in a random-access memory (RAM) 19 prior to forwarding to the highway one circuit 4.

It is noted that each receiver 2 is connected to two highway one circuits 4,4' by respective serial transmit paths 20, 20'. Each highway one card 4, 4' provides respective 500 Hertz and 16 kilohertz clock signals on respective clock leads 21, 21' and 22, 22'.

The respective clock signals being used by the receiver/decoder 18 are selected by a selector 23, the selected 500 Hertz clock determining the scanning of the 'P' wire connections 3 and the 16 kilohertz clock determining transmission of data on either lead 20 or lead 20'.

It is here noted that if the clock signal on lead 22 is selected to control the transmission of data to the highway one circuit 4, the data is transmitted on lead 20. Similarly if lead 22' is selected, data will be transmitted on lead 20' to highway one circuit 4'.

The transmitted data may conveniently be divided into four bytes each comprising eight bits. The four bytes are shown schematically in FIG. 12 and are as follows, the first bit of byte one is a free/busy bit which indicates whether the time slot is in use, this being followed by the upper seven bits of the logger identity received by the receiver 2. The next byte comprises the lower seven bits of the logger identity received and a parity bit on the complete logger identity. The remaining two bytes are for a sixteen bit line identity.

Although all 32 bits are transmitted by the receiver 2 to the highway one circuit 4, only the lower five bits of the line identity are provided by the receiver 2. As has been previously stated, the bit rate between the receiver 2 and the highway one circuit 4 is 16 kilohertz. Thus if all thirty-two 'P' wire connections 3 are in use at the same time, it will take 64 milliseconds to forward all messages to the highway one circuit. For the avoidance of doubt, each timeslot is used on first-come first-served basis such that no message will take more than 64 milliseconds to be forwarded regardless of the number of 'P' wires. The format of a complete message in one timeslot is shown in FIG. 12 and this format is retained throughout subsequent transmission of the message.

Figure 3:
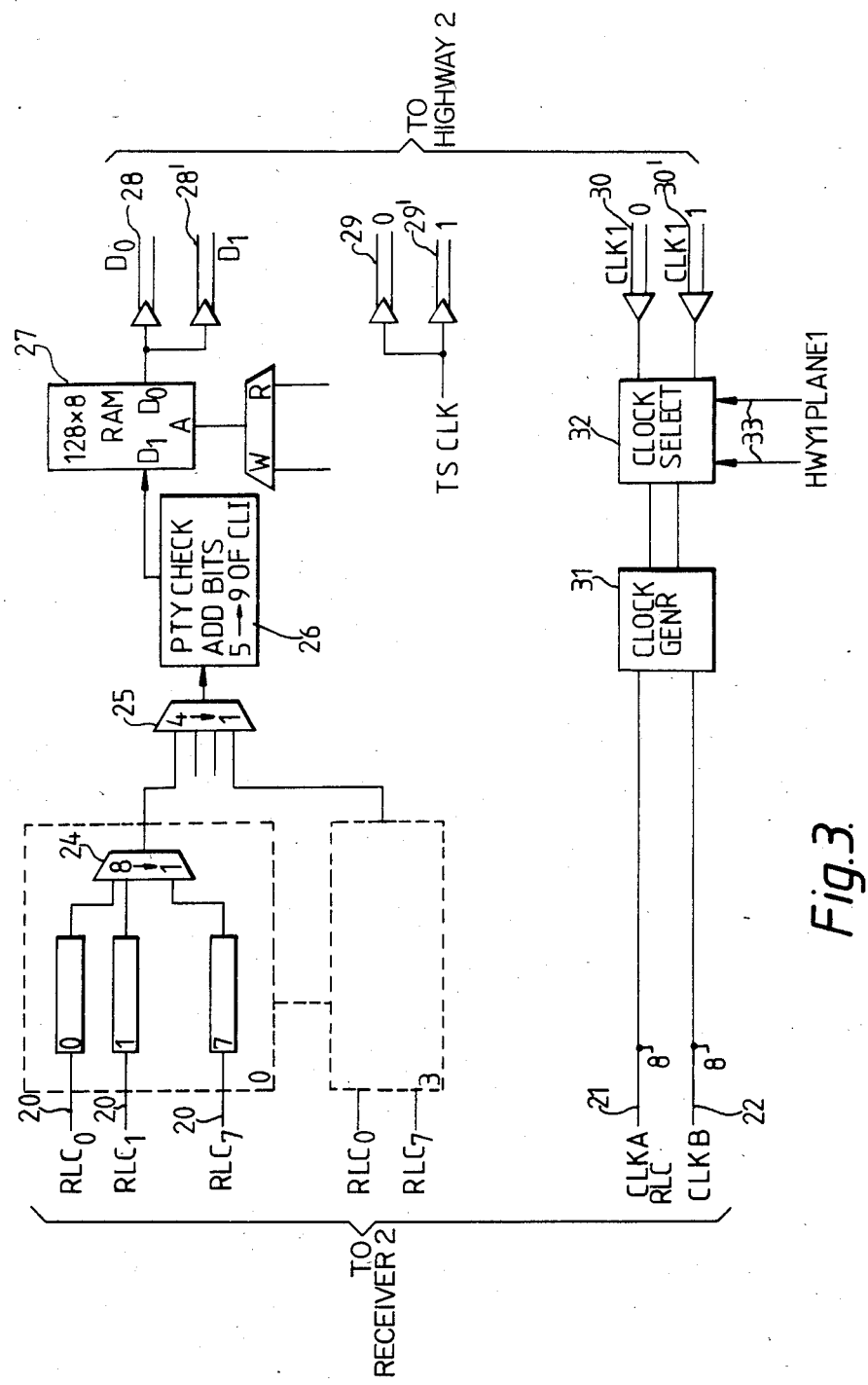
FIG. 3 is a schematic diagram of one of the receiver highways of FIG. 1.

Referring to FIG. 3, each highway one circuit 4 receives data from 32 receiver circuits 2 on the respective data leads 20. The 32 receivers are connected in four groups of eight and each is selected in turn in a similar manner to the selection in the receiver by a one out of eight selector 24 and a one out of four selector 25. As each message is received, a parity check is carried out and the next five bits of the line identification (the five bits identifying the respective receiver 2) are added by receiver circuit 26. The received and modified messages are stored in a RAM 27 and are transmitted to one of the highway two circuits 5 over respective transmit leads 28, 28'.

Since the highway one circuit receives up to 32 messages in each 2 ms period (16 kHz bit rate), it is arranged to forward these messages at a bit rate of 512 kHz under control of a transmit clock signal which is transmitted to the highway two circuits 5 or 5' on respective clock leads 29, 29'.

The transmit clock signal and the 500 Hz and 16 kHz clock signals returned on leads 21 and 22 are derived from a 2 megahertz signal received from the two highway two circuits 5 and 5' over respective leads 30, 30' by a clock generator circuit 31.

To avoid difficulties which could arise from phase differences in the two clocks, all of the highway one circuits 4 are arranged to select the same clock signal using a clock selector 32 which is connected to all of the other highway one clock selectors by respective leads 33.

Figure 4:
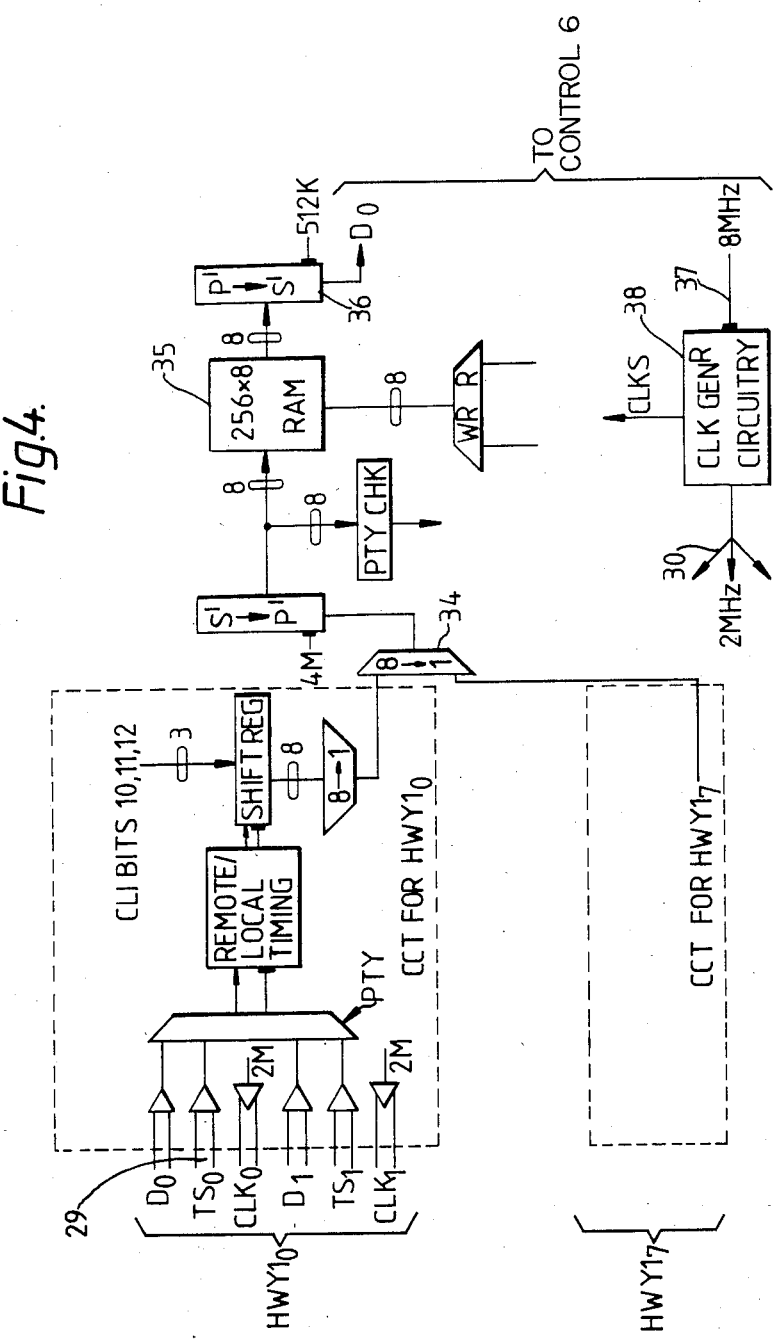
FIG. 4 is a schematic diagram of another of the receiver highways of FIG. 1.

Referring now to FIG. 4, each highway two circuit 5 receives messages from eight of the highway one circuits 4. The messages are again multiplexed by a one out of eight selector 34 and stored in a RAM store 35 for onward transmission. The next three bits of the line identity are added to the data prior to storage. The timing of the receiver is taken from the transmit clock received over lead 27 in case the highway one circuit is working to a master clock signal from a different highway two circuit, say, 4'. The messages now have thirteen of the sixteen required line identification bits and are forwarded over a link 36 to the control circuit 6 again at 512 kHz.

The control circuit 6 provides an 8 megahertz clock signal on lead 37 from which the necessary highway two clocks are derived by a clock generator 38 together with the two megahertz master clock signal previously mentioned.

Eight highway two circuits 5 are connected to one of the control circuits 6 and, referring to FIGS. 5 and 6, as the messages are received from each highway two circuit the final three bits are added to the line identification before storage in a RAM 39. These messages are transferred under control of a microprocessor 40 by way of an interface 41 to the requesting data logger.

It is now necessary to consider the request from the data logger which is received by the control 6 by way of an interface 42. The request will be stored in a respective RAM and forwarded to one of four highway three circuits 7 in dependence upon the first two bits of the logger identity.

As shown in FIG. 8 the highway three circuits 7 analyse the next three bits to determine which of eight highway four circuits 8 is to receive this message.

The highway four circuit 8 as shown in FIG. 9 analyses a further four bits of the message to determine which of sixteen transmitters 9 are to receive the message.

Finally the transmitter 9 shown in FIG. 10 analyses the last four bits of the logger identity and outputs the received message to the appropriate one out of thirty-two 'P' wire connections 10.

Thus the logger which may be a computer such as a miniprocessor for example may have up to 16000 logging points associated with up to 64000 originating points.

Each of the circuits 2, 4, 5, 6, 7, 8 and 9 may be standard regardless of the exchange in which the apparatus is fitted since no exchange dependent strapping is required.

It will be appreciated that where a system is required for an exchange having fewer lines, the highway two circuits 5 may be omitted whilst if less logging points are required the highway circuit three 7 may be omitted without materially affecting the mode of operation.

I claim:

1. A telecommunications exchange of the kind having switched speech pairs and additional wires which are switched in parallel with the speech pairs wherein the improvement comprises detection means responsive to changes in the electrical state of connections through the exchange at each of a plurality of call logging points to cause a data signal to be supplied to the additional wires at each call logging point at which such a change is detected which data signal comprises a plurality of data bits identifying the particular call logging point, a plurality of receivers each arranged to scan the additional wires of a plurality of line circuits of the exchange, which line circuits are individual to that receiver, to detect the presence of a data signal as aforesaid supplied thereto over an additional wire path through the exchange, each of said receivers is arranged to modify the received data signal so detected by the addition of a plurality of data bits which identify the particular additional wire of those scanned by the receiver and is arranged to transmit the modified data to a receiver multiplexer which is common to said plurality of receivers and which further modifies the data signal by the addition of a plurality of data bits identifying the particular receiver supplying the modified data signal, the further modified data signal being utilised to identify the line circuit to which the particular call logging point is connected.

2. A telecommunications exchange as claimed in claim 1 comprising a plurality of receiver multiplexers each arranged to receive modified data from a respective plurality of receivers and to transmit the further modified data signal to a further multiplexer which is common to said plurality of receiver multiplexers and which modifies said data by the addition of a further plurality of data bits identifying the particular receiver multiplexer supplying the further modified data signal.

3. A telecommunications exchange as claimed in claim 2 comprising a plurality of further multiplexers each operating in the manner of said further multiplexer and being connected to control means which is arranged to add to the data signal a respective plurality of data bits identifying the one of said plurality of further multiplexers through which the data signal is received.

4. A telecommunications exchange as claimed in claim 1, in which the data signal as modified by one of the receivers and the receiver multiplexer is transmitted to call logging means.

5. A telecommunications exchange as claimed in claim 4 in which the call logging means is a computer.

6. A telecommunications exchange as claimed in claim 5 in which said computer is also the detection means.

7. A telecommunications exchange as claimed in claim 1 in which the detection means is arranged to detect seizure of a speech pair at each of said call logging points and to forward data identifying a seized call logging point to control means.

8. A telecommunications exchange as claimed in claim 7 wherein on receipt of such data said control means forwards a corresponding data signal to a first demultiplexer which determines from a first plurality of the data bits therein which of a plurality of second demultiplexers is to receive that data signal.

9. A telecommunications exchange as claimed in claim 8 wherein each of said second demultiplexers on receiving a data signal from the first demultiplexer to which it is connected determines from a second different plurality of data bits which of a respective plurality of transmitters connected thereto is to receive that data signal.

10. A telecommunications exchange as claimed in claim 9 wherein on receipt of such a data signal each of said transmitters includes means to forward a corresponding data signal to one of a plurality of said call logging points to which it is connected in dependence upon a further plurality of data bits of that data signal.

11. A telecommunication exchange as claimed in claim 1 wherein data transfer between the receivers and the receiver multiplexers is in channels of respective time division multiplex (TDM) signals.

12. A telecommunications exchange as claimed in claim 2 in which data transfer between the receivers and the receiver multiplexers and between the receiver multiplexers and the further multiplexer is in channels of respective time division multiplex (TDM) signals.

13. A telecommunications exchange as claimed in claim 12 in which the data rate of the TDM signal between the receiver multiplexers and the further multiplexer is higher than the data rate of the TDM signal between the receivers and the receiver multiplexers.

14. A telecommunications exchange as claimed in claim 3 in which data transfer between the receivers and the receiver multiplexers, the receiver multiplexers and the further multiplexer and the further multiplexer and the control means is in channels of respective time-division-multiplex (TDM) signals.

15. A telecommunications exchange as claimed in claim 14 in which the data rates of the respective TDM signals increase towards the control means.

16. A telecommunications exchange as claimed in claim 2 in which the data signal are modified by one of the receivers, one of the receiver multiplexers and the further multiplexer is transmitted to call logging means.

17. A telecommunications exchange as claimed in claim 8 in which data transfer between the control means and the first demultiplexers and between the first demultiplexer and the second demultiplexers is in channels of respective time-division-multiplexed (TDM) signals.

18. A telecommunications exchange as claimed in claim 9 in which data transfer between the control means and the first demultiplexer, the first demultiplexer and the second demultiplexers and the second demultiplexers and the transmitters is in channels of respective time-division-multiplexed (TDM) signals.

19. A telecommunications exchange as claimed in claim 18 in which the data rate of the respective TDM signals decreases towards the transmitters.

* * * * *